United States Patent Office 2,716,640
Patented Aug. 30, 1955

2,716,640

FIBER FORMING COPOLYMER

Alfred B. Craig and George E. Ham, Dayton, Ohio, assignors, by mesne assignments, to The Chemstrand Corporation, a corporation of Delaware No Drawing. Application November 21, 1950, Serial No. 196,941

7 Claims. (Cl. 260—85.5)

This invention relates to new polymeric compositions having unusual value in the preparation of synthetic fibers. More specifically the invention relates to copolymers of acrylonitrile and a minor proportion of a polymerizable N-alkenylbenzimidazole.

Polyacrylonitrile and copolymers of acrylonitrile with minor proportions of other olefinic monomers are well-known in the art of synthetic fiber production. In general, such compositions are quite useful because of the high tensile strength and other desirable physical properties required for fiber production, but many are not useful as general purpose fiber-producing materials, because of the lack of sufficient dye affinity. Polymers of over 85 per cent of acrylonitrile and up to 15 per cent of other monomers, for example vinyl acetate or other vinyl esters of carboxylic acids, methyl methacrylate or other alkyl esters of methacrylic acid wherein the alkyl group has up to four carbon atoms, methyl acrylate or other alkyl acrylates wherein the alkyl radical has up to four carbon atoms, dimethyl fumarate or other dialkyl fumarates wherein the alkyl radical has up to four carbon atoms, dimethyl maleate or other dialkyl maleates wherein the alkyl radical has up to four carbon atoms, vinyl chloroacetate and other vinyl esters of haloacetic acid, styrene, α-methylstyrene and other aromatic hydrocarbons containing vinyl or isopropenyl radicals, vinylidene chloride, methcrylonitrile and vinyl ethers are well-known to be useful non-dyeable substances for the preparation of synthetic fibers. In order to develop dye receptivity of such compositions it is necessary to either modify the previously prepared copolymer or to change the polymerization procedure to render them receptive to dyestuffs.

The purpose of the present invention is to provide methods of modifying the non-dyeable copolymers of the prior art. A further purpose of this invention is to provide new dye-receptive compositions while maintaining the exceptional fiber forming properties of the acrylonitrile polymers. A still further purpose is to provide new and valuable synthetic fibers of general utility with both optimum physical properties and unusual dye acceptance.

In copending application, Serial No. 197,828, filed November 27, 1950, by Eugene L. Ringwald and Alfred B. Craig, there are described and claimed useful polymerizable compounds, the allyl, methallyl and chloroallyl benzimidazoles having the structure:

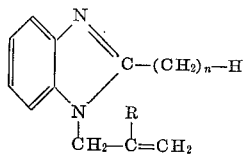

wherein R is a radical of the group consisting of hydrogen, chlorine and methyl and $n$ is a small whole number from 0 to 4, inclusive. These monomeric compositions may be used to provide the dye-receptive property to acrylonitrile copolymers. When employed to provide the dye receptive property to acrylonitrile copolymers, such as hereinbefore outlined, the monomeric compositions are employed in an amount from 1 to 15%. Acrylonitrile copolymers contemplated by the present invention are those comprising from 75 to 99% by weight of acrylonitrile in polymeric form and from zero up to 10% of another polymerizable monomer, such as hereinbefore pointed out. The compounds may be used as comonomers in the acrylonitrile polymerization, and the resulting copolymers are capable of fabrication into fibers having the desirable dye acceptance.

The new copolymers may be prepared by polymerizing from 85 to 98 per cent of acrylonitrile and from two to 15 per cent of the unsaturated benzimidazoles by conventional procedures. Although mass and solution polymerization procedures are useful, optimum compositions may be prepared by polymerization in an aqueous medium. Any emulsion polymerization procedure which produces high molecular weight compositions of uniform physical and chemical structure will be found suitable. Preferred procedures may involve conditions of operation which maintain substantially uniform conditions throughout the course of the reaction. Although batch procedures in which all of the monomers to be polymerized are charged to the reaction medium at the outset may be used, preferred procedures involve the gradual addition of the monomers in desired ratios continuously during the course of the reaction. The necessary catalysts and, if desired, emulsion or dispersing agents may be added continuously or intermittently in increments throughout the reaction. In this manner a substantially isothermal polymerization reaction may be achieved.

It has been found that the emulsion polymerizations may be effected at reflux temperatures, which temperatures will vary with the concentration of monomers in the aqueous medium. Accordingly, a more uniform polymerization reaction will be achieved by adding the monomers in the desired proportions at a varying rate such that the reflux temperature is maintained at a constant value. Such a reaction will insure the rapid production of a copolymer of substantially uniform physical and chemical properties.

If desired, polymerization may be conducted at lower temperatures by the well-known redox methods. This procedure operates with the usual catalysts and emulsion or dispersing agents, but in the presence of sodium sulfite, or other salt of an acid of a non-metal in the lower of two valence forms capable of existence. This redox polymerization method has the advantage of preparing higher molecular weight polymers, which are often of better color by reason of the low temperature at which polymerization takes place. The method is subject to the disadvantage of requiring much higher monomer to water ratios and therefore larger expenditures of equipment.

Emulsion polymerization methods usually require the use of free radical-producing catalysts, such as peroxides, azo compounds, and other well-known compounds capable of liberating free radicals under the conditions of polymerization. Suitable catalysts for effecting the polymerization reaction are potassium peroxide, potassium persulfate, hydrogen peroxide, benzoyl peroxide, and azo-2,2'-diisobutyronitrile. The catalysts may be used to the extent of 0.05 per cent to 2.0 per cent by weight of the monomer to be polymerized.

The polymerization reaction is also conducted in the presence of emulsion stabilizing or dispersing agents. These agents are compounds containing both hydrophilic and hydrophobic radicals and serve to maintain the finely divided solid particles in an emulsified state or at least in a dispersed state whereby lumping or other agglomeration of the particles is prevented. Suitable dispersing agents useful in the practice of this invention are the salts of the various formaldehyde condensed aromatic sulfonic acids, salts of the various high molecular weight monocarboxylic acids and mixtures thereof as found in the commercial soaps and other known wetting agents. The dispersing agents may be used to the extent of 0.05 per cent to 0.50 per cent based on the weight of the monomers to be polymerized.

The new copolymers may be prepared in the presence of conventional molecular weight regulators, for example tertiary-dodecyl mercaptan, and thioglycolic acid, which may be added at the beginning of the reaction or continuously or in increments during the course of the reaction.

The copolymers prepared by the copolymerization of acrylonitrile with the various allyl substituted benzimidazoles may be isolated from the reaction mixture by conventional methods. Under some conditions the solid suspended polymer will be precipitated and may be separated from the aqueous medium by filtration. If found present in more stable emulsified form a coagulation agent, such as an electrolyte or alcohol, may be required before the separating operation. The solid polymer, however prepared, may be then dried to remove residual moisture. Further processing to fibers by dissolving in a suitable solvent, extruding the solution into a medium which removes the solvent and precipitates the fiber in continuous form and processing of the fibers may be conducted in the manner well-known to the art.

Other details of the process of preparing the copolymers and processing of the polymeric compositions into fibers are set forth with respect to the following specific examples.

Example 1

A mixture of 46 parts by weight of acrylonitrile, four parts of N-allylbenzimidazole, 100 parts of distilled water, 0.5 part of azo-2,2'-diisobutyronitrile and 0.05 part of a sodium salt of formaldehyde condensed naphthalenesulfonic acid was heated in a closed vessel at 75° C. for three hours and 15 minutes. During the reaction the bottle was tumbled continuously to maintain an intimate mixture of the reagents. The copolymer so obtained was washed with alcohol and dried. The polymer was dissolved to the extent of 16 per cent in dimethylacetamide and was extruded through a spinneret having 30 apertures each 0.005 inch in diameter. The extruded polymer was coagulated in a mixture of 60 per cent dimethylacetamide and 40 per cent of water. The fibers were washed with water and stretched on a heated drum. The fibers so produced were dyed for one hour at 90° C. in a dye bath containing one cc. of two per cent Wool Fast Scarlet dye, one cc. of ten per cent of sulfuric acid and 43 grams of water for each gram of fiber dyed. A deep scarlet shade was developed on the fibers, whereas a comparable treatment of a 95 per cent acrylonitrile and five per cent vinyl acetate was not dyeable. A similar dyeing experiment using five times as much Wool Fast Scarlet produced fibers of even deeper shade.

Example 2

An agitated reaction flask was charged with 400 parts of distilled water and 0.2 part of a sodium salt of a formaldehyde condensed naphthalenesulfonic acid. The flask and its contents were heated to 72° C. at which time a solution of 190 parts of acrylonitrile, ten parts of N-allylbenzimidazole and 1.5 parts of azo-2,2'-diisobutyronitrile was added gradually over a period of 2.25 hours. After the entire lot of monomers had been added the reaction was continued at the reflux temperature for one hour and then steam distilled to remove unreacted monomer. A conversion of 84 per cent of the monomers to copolymer resulted, which copolymer was found to have a specific viscosity of 0.32 in 0.1 per cent dimethylformamide solution. The polymer was dissolved to the extent of ten per cent in N,N-dimethylacetamide and was spun through a spinneret into a mixture of 60 per cent dimethylacetamide and 40 per cent of water. After washing with water the fiber was stretched 380 per cent. The strong fiber which resulted was successfully dyed with both two and ten per cent Wool Fast Scarlet solutions using the dyeing procedure described in the preceding experiment.

Example 3

A mixture of 92 parts of acrylonitrile, eight parts of N-allylbenzimidazole, 0.5 parts of potassium persulfate, 0.5 part of triethanolamine and 400 parts of water was refluxed for three hours at 72° C. The copolymer was separated from the reaction mass by filtration, and then washed with alcohol and dried. An easily dyeable fiber was prepared by methods described in the preceding experiments.

What we claim is:

1. A polymeric composition comprising from 85 per cent to 98 per cent by weight of acrylonitrile in polymeric form, and from two to 15 per cent by weight of a compound having the structural formula

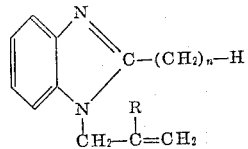

wherein R is a radical of the group consisting of hydrogen, chlorine, and methyl and $n$ is a small whole number from 0 to 4, inclusive.

2. The product of claim 1 wherein the said compound is N-allylbenzimidazole.
3. The product of claim 1 wherein the said compound is N-methallylbenzimidazole.
4. The product of claim 1 wherein the said compound is N-chloroallylbenzimidazole.
5. The product of claim 1 wherein the said compound is 1-methallyl-2-methylbenzimidazole.
6. The product of claim 1 wherein the said compound is 1-allyl-2-methylbenzimidazole.
7. A new copolymer comprising acrylonitrile and a polymerizable monomer having the structural formula

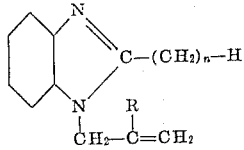

wherein R is a radical of the group consisting of hydrogen, chlorine, and methyl, and $n$ is a small whole number from 0 to 4 inclusive.

References Cited in the file of this patent

UNITED STATES PATENTS

| | | |
|---|---|---|
| 2,436,926 | Jacobson | Mar. 2, 1948 |
| 2,606,175 | Price | Aug. 5, 1952 |
| 2,623,879 | Ringwald et al. | Dec. 30, 1952 |